United States Patent
Lai et al.

(10) Patent No.: US 7,709,120 B2
(45) Date of Patent: *May 4, 2010

(54) METHOD TO MAXIMIZE FUEL CELL STACK SHORTING RESISTANCE

(75) Inventors: Yeh-Hung Lai, Webster, NY (US); Jeffrey A. Rock, Fairport, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 312 days.

This patent is subject to a terminal disclaimer.

(21) Appl. No.: 11/769,754

(22) Filed: Jun. 28, 2007

(65) Prior Publication Data

US 2009/0004513 A1    Jan. 1, 2009

(51) Int. Cl.
  *H01M 8/04* (2006.01)
(52) U.S. Cl. .......................................... 429/13
(58) Field of Classification Search .................. None
  See application file for complete search history.

(56) References Cited

U.S. PATENT DOCUMENTS

| 4,567,086 A * | 1/1986 | Fukuda et al. ............. 428/166 |
| 6,613,203 B1 | 9/2003 | Hobson et al. |
| 6,620,538 B2 | 9/2003 | Bai et al. |
| 2003/0203269 A1* | 10/2003 | Rock ............................ 429/37 |
| 2004/0202917 A1* | 10/2004 | Chapman et al. ............. 429/37 |

FOREIGN PATENT DOCUMENTS

DE   43 36 850 A1   5/1995
DE    4336850 A1 *  5/1995

* cited by examiner

*Primary Examiner*—Robert Hodge
(74) *Attorney, Agent, or Firm*—Fraser Clemens Martin & Miller LLC; J. Douglas Miller

(57) ABSTRACT

A method of producing a fuel cell stack is disclosed, the method including the steps of compressing the fuel cell stack at a first pressure and compressing the fuel cell stack at a second pressure higher than the first pressure, wherein a shorting resistance of fuel cells in the fuel cell stack is maximized and a durability of the fuel cell stack is maximized.

13 Claims, 2 Drawing Sheets

METHOD TO MAXIMIZE FUEL CELL STACK SHORTING RESISTANCE

FIELD OF THE INVENTION

The present invention relates to a fuel cell stack and more particularly to a method of maximizing the shorting resistance of the fuel cell stack to maximize a durability thereof.

BACKGROUND OF THE INVENTION

A fuel cell system is increasingly being used as a power source in a wide variety of applications. Fuel cell systems have been proposed for use in power consumers such as vehicles as a replacement for internal combustion engines, for example. Such a system is disclosed in commonly owned U.S. patent application Ser. No. 10/418,536, hereby incorporated herein by reference in its entirety. Fuel cells may also be used as stationary electric power plants in buildings and residences, as portable power in video cameras, computers, and the like. Typically, the fuel cells generate electricity used to charge batteries or to provide power for an electric motor.

Fuel cells are electrochemical devices which directly combine a fuel such as hydrogen and an oxidant such as oxygen to produce electricity. The oxygen is typically supplied by an air stream. The hydrogen and oxygen combine to result in the formation of water.

The basic process employed by a fuel cell is efficient, substantially pollution-free, quiet, free from moving parts (other than an air compressor, cooling fans, pumps and actuators), and may be constructed to yield only heat and water as by-products. The term "fuel cell" is typically used to refer to either a single cell or a plurality of cells depending upon the context in which it is used. The plurality of cells is typically bundled together and arranged to form a stack with the plurality of cells commonly arranged in electrical series. Since single fuel cells can be assembled into stacks of varying sizes, systems can be designed to produce a desired energy output level providing flexibility of design for different applications.

Different fuel cell types can be provided such as phosphoric acid, alkaline, molten carbonate, solid oxide, and proton exchange membrane (PEM), for example. The basic components of a PEM-type fuel cell are two electrodes separated by a polymer membrane electrolyte. Each electrode is coated on one side with a thin catalyst layer. The electrodes, catalyst, and membrane together form a membrane electrode assembly (MEA).

In a typical PEM-type fuel cell, the MEA is sandwiched between "anode" and "cathode" gas diffusion media (GDM). The GDM and MEA are pressed between a pair of electronically conductive plates. The plates conduct current between adjacent cells internally of the stack in the case of bipolar plates and conduct current externally of the stack (in the case of monopolar plates at the end of the stack).

Electrical shorting through the MEA of a fuel cell is one of the major failure modes of the fuel cell. MEA shorting not only degrades the performance of the fuel cells, but also leads to membrane thinning and pinhole formation, which are undesirable. In the extreme case, the shorting can also lead to significant overheating, which not only can damage soft goods of the fuel cell, but also fuel cell plate hardware. Accordingly, it is desirable to devise a mitigation method to reduce the propensity of MEA shorting.

Despite the above-mentioned consequences from the MEA shorting, the fundamental mechanism of MEA shorting is poorly understood. Currently, there are two main theories in respect of shorting mechanisms. One is the "poking" mechanism of individual carbon fibers, and the other is the "indentation" mechanism of lumped fibers/binders (hard spots) in the GDM.

The "poking" of individual fibers through the GDM creates direct contact and passage for electrical conduction between the anode and the cathode sides of the MEA. Although this theory appears plausible, shorting tests have indicated that this type of mechanism is not the dominant mechanism causing MEA shorting.

Studies have shown that hard spots in the GDM are more likely the cause of MEA shorting. It has been a continuing challenge to provide an efficient and cost efficient method of minimizing hard spots in the GDM.

It would be desirable to produce a fuel cell stack assembly process to maximize MEA shorting resistance in the fuel cell to maximize a durability of the fuel cell stack, wherein soft goods and hardware used in the fuel cell are substantially unchanged, and a cost of the process is minimized.

SUMMARY OF THE INVENTION

Harmonious with the present invention, a fuel cell stack assembly process to maximize MEA shorting resistance in the fuel cell to maximize a durability of the fuel cell stack, wherein soft goods and hardware used in the fuel cell are substantially unchanged, and a cost of the process is minimized, has surprisingly been discovered.

In one embodiment, a method for producing a fuel cell comprises the steps of providing a fuel cell having a membrane electrode assembly and at least one gas diffusion media; compressing the fuel cell at a first pressure; and compressing the fuel cell at a second pressure higher than the first pressure.

In another embodiment, a method for producing a fuel cell stack comprises the steps of: providing a plurality of fuel cells, each of the fuel cells having a membrane electrode assembly and at least one gas diffusion media; compressing the fuel cells at a first pressure; and compressing the fuel cells at a second pressure, the second pressure higher than the first pressure.

In another embodiment, a fuel cell comprises: a membrane electrode assembly; and a pair of gas diffusion media compressed on the membrane electrode assembly at a first pressure and a second pressure higher than the first pressure.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed and illustrated, the steps presented are exemplary in nature, and thus, the order of the steps is not necessary or critical.

Figure 1:
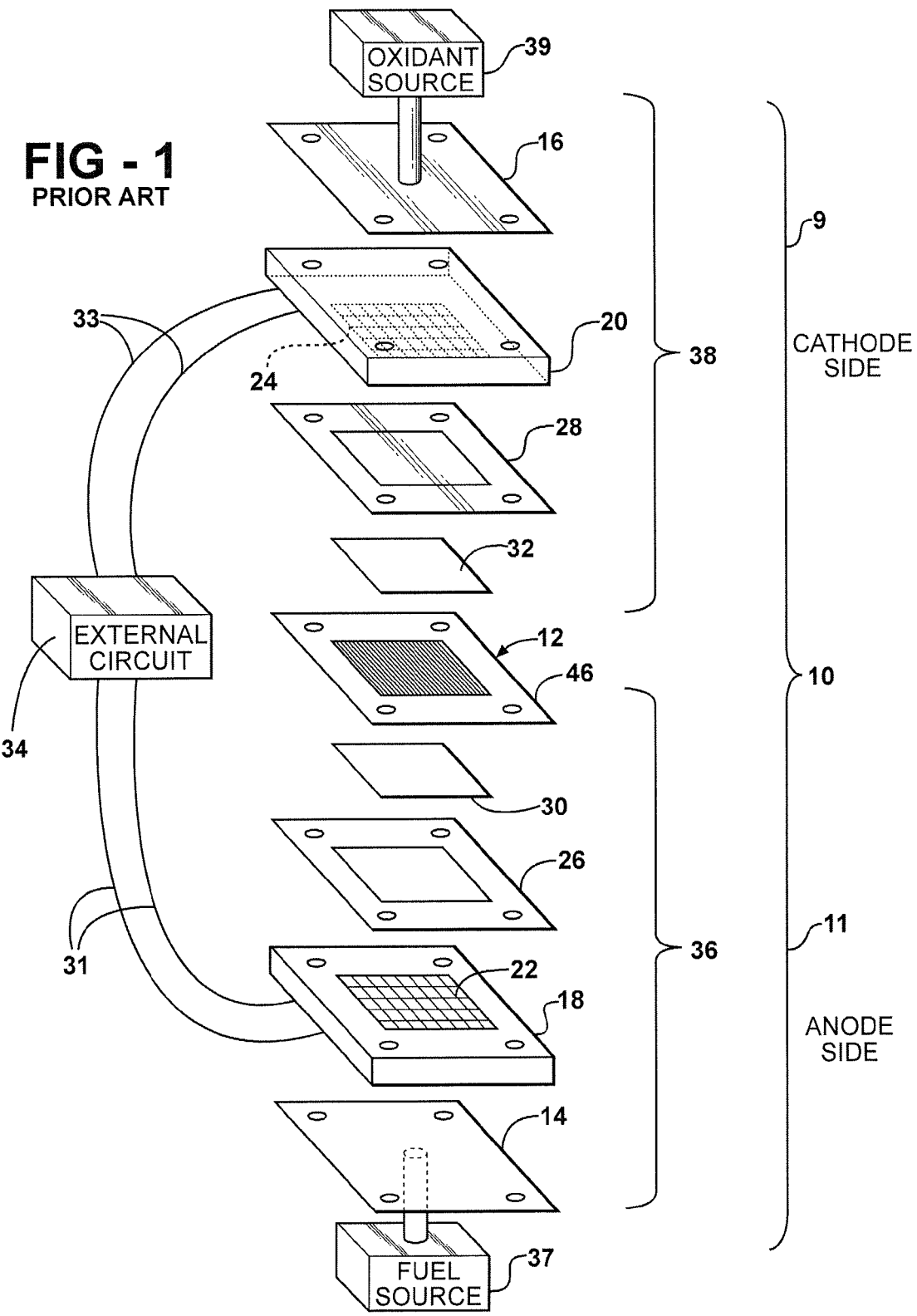
FIG. 1 is an exploded perspective view of a fuel cell system according to the prior art.

FIG. 1 shows a fuel cell 10 having a cathode side 9 and an anode side 11. The fuel cell 10 is in fluid communication with a fuel source 37 and an oxidant source 39. Graphite blocks 18, 20 having a plurality of openings 22, 24 to facilitate fluid distribution are disposed adjacent the insulation end plates 14, 16. It is understood that electrically conductive electrode plates (not shown) can be used in the place of the graphite blocks 18, 20. Gaskets 26, 28 and gas diffusion media (GDM) 30, 32, such as carbon fiber paper, for example, having respective anode and cathode connections 31, 33, are respectively disposed between a membrane electrode assembly (MEA) 12 and the graphite blocks 18, 20. An oxidant and current transport means 36 is made up of the graphite block 18, the gasket 26, and the GDM 30. A fuel and current transport means 38 is made up of the graphite block 20, the gasket 28, and the GDM 32. The anode connection 31 and the cathode connection 33 are used to interconnect the fuel cell 10 with an external circuit 34, and may include other fuel cells (not shown) as desired.

A fuel cell stack (not shown) is constructed of a plurality of fuel cells 10 connected in series. Once a desired number of fuel cells 10 are joined together to form the fuel cell stack, a coolant system (not shown) is provided with the fuel cell stack. The illustrative fuel cell stack described herein is commonly used as a power plant for the generation of electric power in a vehicle, for example.

In use, a fuel such as hydrogen, for example, is supplied from the fuel source 37 and an oxidant such as oxygen, for example, is supplied from the oxidant source 39. The fuel and oxidant from respective sources 37, 39 diffuse through respective fluid and current transport means 36, 38 to opposing sides of the MEA 12. Porous electrodes (not shown) form an anode (not shown) at the anode side 11 and a cathode (not shown) at the cathode side 9, and are separated by a proton exchange membrane (PEM) 46. The PEM 46 provides for ion transport to facilitate a chemical reaction in the fuel cell 10. Typically, the PEM 46 is produced from copolymers of suitable monomers. Such proton exchange membranes may be characterized by monomers of the structures:

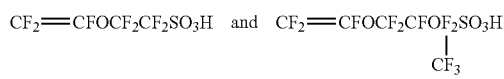

Such a monomer structure is disclosed in detail in U.S. Pat. No. 5,316,871 to Swarthirajan et al, incorporated herein by reference in its entirety.

Use of the fuel cell stack may create electrical shorting through the MEA 12, which degrades the performance of the fuel cell stack and can lead to significant overheating thereof. The shorting through the MEA 12 can be caused by hard spots (not shown) in the GDM 30, 32.

Figure 2:
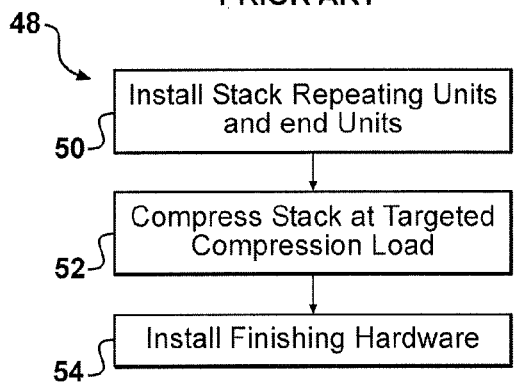
FIG. 2 is a flow diagram of a fuel cell stack assembly process according to the prior art.

FIG. 2 shows a flow diagram of a prior art fuel cell stack assembly process 48 used to produce prior art fuel cell stacks (not shown).

The prior art fuel cell stack assembly process 48 includes the steps of: installing stack repeating units and end units 50; compressing the stack at a targeted compression load 52, such as 200 p.s.i., for example; and installing finishing hardware 54. The repeating units are typically the MEA 12, the graphite blocks 18, 20 or the electrically conductive electrode plates, the gaskets 26, 28, and the GDM 30, 32. The end units are typically the insulation end plates 14, 16. The fuel cell stack is typically compressed in a hydraulic press (not shown). Finishing hardware typically includes side plates (not shown) or tie rod bolts (not shown), for example, used to secure the components of the stack in place.

Figure 3:
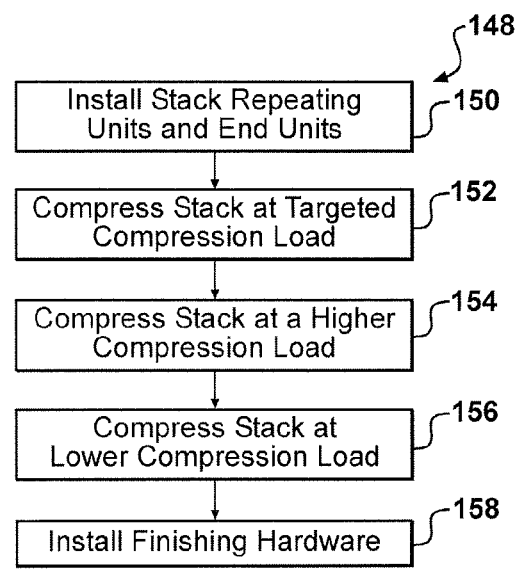
FIG. 3 is a flow diagram of a fuel cell stack assembly process according to an embodiment of the invention.

FIG. 3 illustrates a flow diagram of a fuel cell stack assembly process 148 used to produce fuel cell stacks (not shown) in accordance with an embodiment of the invention. The fuel cell stack assembly process 148 includes the steps of: installing stack repeating units and end units 150; compressing the stack at a targeted compression load 152, such as 200 p.s.i., for example; compressing the stack at a higher compression load 154, such as 250 p.s.i., for example; compressing the stack at a lower compression load 156, such as the targeted compression load 152; and installing finishing hardware 158. It is understood that other targeted compression loads, higher compression loads, and lower compression loads can be used as desired, such as a targeted compression load of 300 p.s.i., a higher compression load of 400 p.s.i., and a lower compression load of 300 p.s.i., for example. Additionally, it is understood that the target compression load 152 and the lower compression load can be different, if desired. In the embodiment described, the repeating units are the MEA 12, the graphite blocks 18, 20 or electrically conductive electrode plates, the gaskets 26, 28, and the GDM 30, 32. The end units are typically the insulation end plates 14, 16.

The fuel cell stack is compressed at the targeted load, a higher load, and then at a lower load. The compression of the fuel cell stack typically occurs in a hydraulic press (not shown). However, it is understood that other means of compressing the fuel cell stack can be used, as desired. The finishing hardware includes side plates (not shown), tie rod bolts (not shown), or other hardware, for example, to secure the components of the fuel cell stack. Favorable results have been obtained where the step of compressing the stack at a higher compression load 154 occurs at room temperature of approximately 25 degrees Celsius, and at a low relative humidity in the range of 20 to 50%. It is understood that the step of compressing the stack at a higher compression load 154 can occur at other temperatures and other humidities as desired, without departing from the scope and spirit of the invention. It has surprisingly been discovered that when the compression occurs at room temperature and low humidity, a strength and a durability of the MEA 12 is maximized, thus minimizing damage to the MEA 12 caused by electrical shorting.

The fuel cell stack assembly process 148 was tested against the prior art fuel cell stack assembly process 48. Four fuel cells 200, 202, 204, 206 were built and operated. In all cases, the components used to produce the fuel cells were substantially identical. In the first prior-art fuel cell 200 the GDM 30, 32 were not pre-compressed. In the second prior-art fuel cell 202, the GDM 30, 32 were pre-compressed at 300 p.s.i. for 2 hours, using a process described in commonly owned U.S.

patent application Ser. No. 11/272,369, hereby incorporated herein by reference in its entirety. In the two fuel cells 204, 206 assembled using the fuel cell stack assembly process 148, the GDM 30, 32 were pre-compressed at 300 p.s.i. for fifteen minutes.

All four fuel cells 200, 202, 204, 206 were compressed using a spring loaded mechanism to ensure the compression pressure remained constant during testing. For the prior-art fuel cells 200, 202, an average compression pressure of 300 p.s.i. was applied by the hydraulic press, and maintained by retention hardware (not shown). For the fuel cells 204, 206, the fuel cells 204, 206 were first compressed to 300 p.s.i. for fifteen minutes, followed by a higher compression at 400 p.s.i. for five minutes. Thereafter, an average compression pressure of 300 p.s.i. was applied by the hydraulic press and maintained by the retention hardware. For all of the fuel cells 200, 202, 204, 206, a 50 cm$^2$ graphite flow field and segmented current distribution circuit board were used.

Thereafter, all four fuel cells 200, 202, 204, 206 were operated at a temperature of ninety-five degrees Celsius and fifty percent relative humidity in an open circuit voltage (OCV) condition. The OCV condition was interrupted every five hours to perform in-situ shorting diagnostics. By monitoring a shorting current density distribution over time using a current distribution tool (not shown), an initiation of shorting in each of 100 segments of the fuel cells 200, 202, 204, 206 was detected. The progression of the shorting in each of the segments was also monitored. The shorting failure was plotted for each segment where the shorting current density exceeded 0.3 mA/cm$^2$, which corresponded to 1667 ohm-cm$^2$ of shorting resistance.

Figure 4:
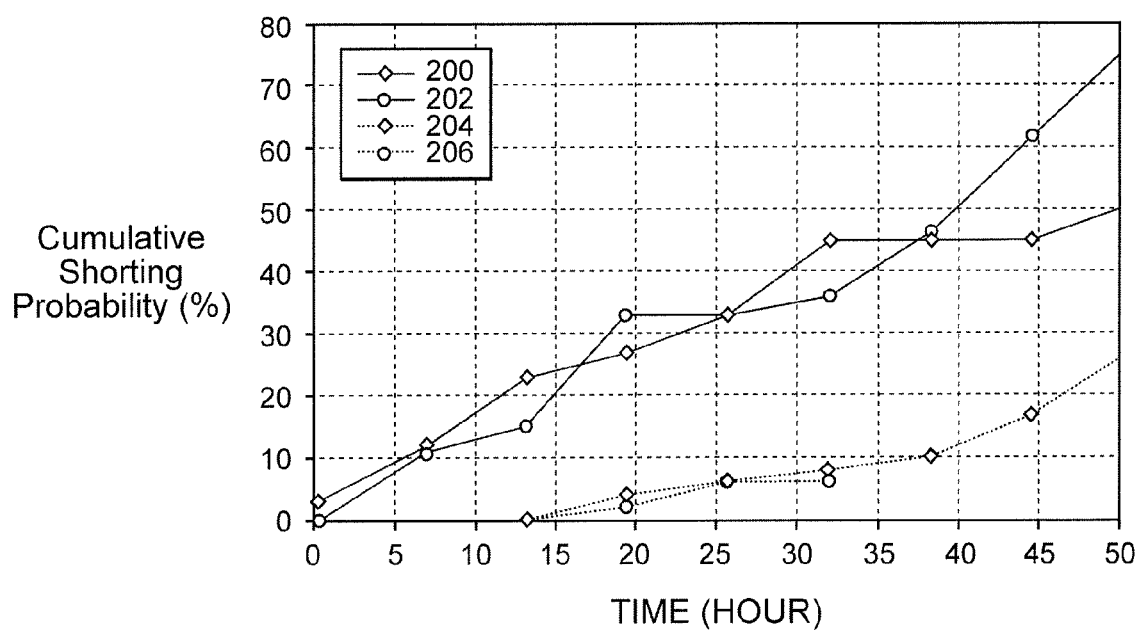
FIG. 4 is a graph illustrating a MEA cumulative shorting probability versus time for two fuel cells assembled according to the prior art and two fuel cells assembled using the fuel cell stack assembly process according to the embodiment of the invention illustrated in FIG. 3.

FIG. 4 is a graph illustrating the cumulative shorting probability versus time for the fuel cells 200, 202, 204, 206. The graph indicates that the shorting resistance of the fuel cells 204, 206 built using the fuel cell stack assembly process 148 is higher compared to the shorting resistance of the fuel cells 200, 202 built using the prior art fuel cell stack assembly process 48. It is noted that in-situ shorting diagnostics on the fuel cell 206 was stopped after thirty two hours as a result of a malfunction of the testing equipment.

By compressing the stack to a higher compression load 154 above the targeted compression load and returning to a lower compression load, binders and/or fibers (not shown) that form the hard spots of the GDM 30, 32 are broken up. The breaking up of the hard spots minimizes the compression variation from the hard spots to soft spots of the GDM 30, 32. This results in a minimization of damage to the MEA 12 from the GDM 30, 32, as a result of shorting through the MEA, as indicated by the graph illustrated in FIG. 4. As a result, a durability of the fuel cells 204, 206 using the fuel cell stack assembly process 148 according to the embodiment of the invention described herein is maximized.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A method of producing a fuel cell comprising the steps of:
   providing a fuel cell having a membrane electrode assembly and at least one gas diffusion media;
   compressing the fuel cell at a first pressure;
   compressing the fuel cell at a second pressure higher than the first pressure;
   compressing the fuel cell to a third pressure lower than the second pressure; and maintaining the third pressure on the fuel cell.

2. The method according to claim 1, wherein the third pressure is substantially equal to the first pressure.

3. The method according to claim 1, wherein the fuel cell is compressed at a relative humidity of less than 75 percent.

4. The method according to claim 3, wherein the fuel cell is compressed at a relative humidity of between about 20 percent and about 50 percent.

5. The method according to claim 1, wherein the first pressure is between about 100 p.s.i. and about 300 p.s.i and the second pressure is at least 50 p.s.i. higher than the first pressure.

6. The method according to claim 1, further comprising the step of assembling a plurality of fuel cells to form a fuel cell stack.

7. The method according to claim 6, further comprising the step of providing and installing finishing hardware on the fuel cell to maintain the pressure.

8. The method according to claim 1, wherein at least one of the steps of compressing the fuel cell at a first pressure and compressing the fuel cell at a second pressure is performed at a temperature in a range from about 20 degrees Celsius to about 40 degrees Celsius.

9. A method of producing a fuel cell stack comprising the steps of:
   providing a plurality of fuel cells, each of the fuel cells having a membrane electrode assembly and at least one gas diffusion media;
   compressing the fuel cells at a first pressure;
   compressing the fuel cells at a second pressure, the second pressure higher than the first pressure;
   compressing the fuel cells at a third pressure lower than the second pressure; and
   maintaining the third pressure on the fuel cells.

10. The method according to claim 9, wherein the third pressure is substantially equal to the first pressure.

11. The method according to claim 9, wherein the first pressure is between about 100 p.s.i. and about 300 p.s.i and the second pressure is at least 50 p.s.i. higher than the first pressure.

12. The method according to claim 9, further comprising the step of providing and installing finishing hardware to the fuel cell to maintain the third pressure.

13. The method according to claim 9, wherein at least one of the steps of compressing the fret cells at a first pressure and compressing the fuel cells at a second pressure is performed at a temperature at a temperature in a range from about 20 degrees Celsius to about 40 degrees Celsius.

* * * * *